United States Patent [19]
Katchka

[11] 3,777,777
[45] Dec. 11, 1973

[54] FLOW CONTROL DEVICE
[75] Inventor: Jay R. Katchka, Cypress, Calif.
[73] Assignee: Robertshaw Controls Company, Richmond, Va.
[22] Filed: July 31, 1972
[21] Appl. No.: 276,481

Related U.S. Application Data
[63] Continuation of Ser. No. 21,868, March 23, 1970, abandoned, which is a continuation-in-part of Ser. No. 643,170, June 2, 1967, Pat. No. 3,550,623.

[52] U.S. Cl..... 137/454.6, 137/505.18, 137/505.27, 92/99
[51] Int. Cl.......................................... F16k 31/365
[58] Field of Search................. 137/454.2, 454.6, 137/505.8, 505.27; 92/99

[56] References Cited
UNITED STATES PATENTS
2,826,214  3/1958  Völker............................ 137/454.6
2,982,299  5/1961  Ksieski........................... 137/454.6
3,087,705  4/1963  Hamilton .................... 137/505.27 X Primary Examiner—Harold W. Weakley
Attorney—Anthony A. O'Brien

[57] ABSTRACT

A fluid control device including a manual plug valve movable between a plurality of controlling positions and a pressure regulator assembly operatively disposed in the plug valve for independent movement to regulate the pressure of the fluid flow permitted by the plug valve. An outlet pressure sensing cavity in the regulator assembly is defined by a regulating diaphragm and a balancing diaphragm with loading of the regulating diaphragm being accomplished by resilient means or by pressure means.

6 Claims, 6 Drawing Figures

3,777,777

INVENTOR
JAY R. KATCHKA
BY
Anthony A. O'Brien
ATTORNEY

INVENTOR
JAY R. KATCHKA

BY Anthony A. O'Brien
ATTORNEY

FLOW CONTROL DEVICE

This is a continuation of my pending application Ser. No. 21,868 filed Mar. 23, 1970, now abandoned, which was filed as a continuation-in-part of application Ser. No. 643,170 filed June 2, 1967 now U.S. Pat. No. 3,550,623.

The present invention relates to fluid flow control devices and, in particular, to such a control device for controlling a fluid flow and for regulating the pressure of the fluid flow by a combined arrangement.

It is conventional in the art to control a fluid flow and to regulate the pressure of the fluid flow as when the fluid flow is fuel gas that is required to be supplied to gas burner apparatus at a predetermined pressure in accordance with the capacity of such burner apparatus. However, the known devices have many disadvantages, such as: complex arrangements for the plural components needed for both flow control and flow pressure regulation; expensive manufacturing costs and installation costs; complicated arrangements for loading the pressure regulator assembly; and, unreliable regulators in that response to outlet pressure is not accurately or precisely obtained.

It is, therefore, an object of the present invention to construct a unitary, simple and economical flow control device which both controls a fluid flow and regulates the pressure of such fluid flow.

Another object of the present invention is to combine the manual plug valve of a control device with a pressure regulator assembly.

This invention has another object in that a pressure regulator assembly is operatively disposed in a hollowed portion of a casing to regulate a fluid flow therethrough.

It is another object of the present invention to provide a rotary type plug valve with a pressure regulating valve and with an outlet pressure sensing cavity to affect the movement of such regulating valve.

The present invention has another object in that the regulating diaphragm of a balanced pressure regulator assembly is pressure loaded.

A further object of this invention is to utilize the pilot flow in a control device to pressure load the regulating diaphragm of a balanced pressure regulator.

A still further object of the present invention is to pressure load the regulating diaphragm of a balanced pressure regulator by meanss of a regulated pilot flow in a control device.

In accordance with the present invention, a fluid flow control device includes a casing having inlet and outlet means with flow passage means therebetween, manually operable plug valve means movably disposed in the passage means for movement between a plurality of controlling positions to control a fluid flow therethrough, and a pressure regulator assembly for regulating a fluid flow through the passage means and having pressure responsive regulating means operatively disposed in the valve means so as to be operated independently of the valve means.

Other objects and advantages of the present invention will become apparent from the following description taken in conjunction with the accompanying drawing wherein.

Figure 1:
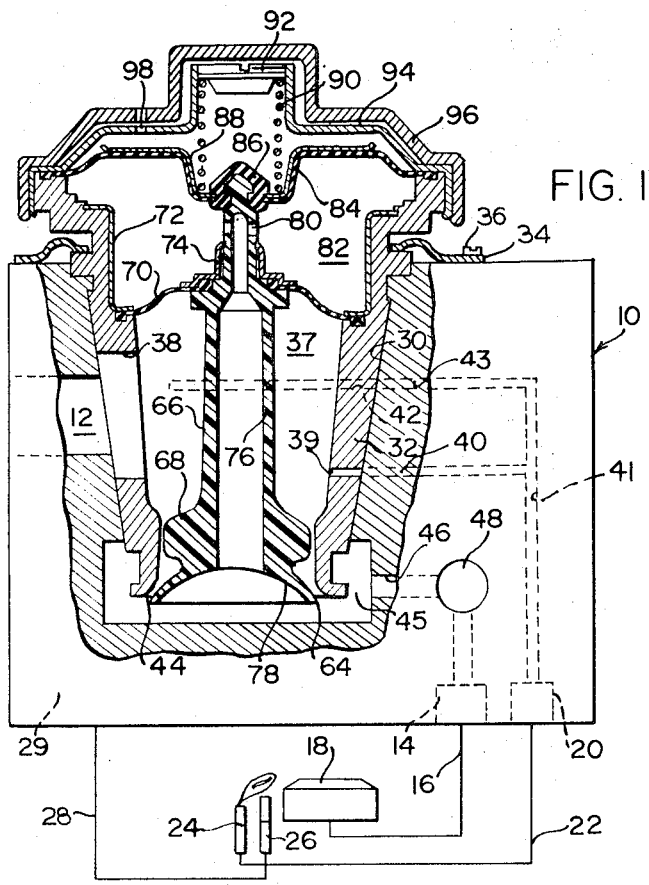
FIG. 1 is a schematic diagram of a control device embodying the present invention with parts broken away to illustrate a detailed section on an enlarged scale.
Figure 2:
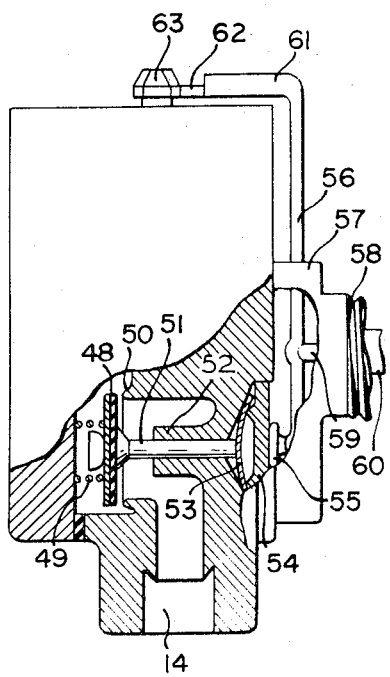
FIG. 2 is a side elevation of FIG. 1 with parts broken away and parts in section.

As is illustrated in FIGS. 1 and 2, the present invention is embodied in a thermostatic control device for fuel burner apparatus. The control device casing, indicated generally at 10, has an inlet 12 adapted for connection to a source of fuel such as a gas main (not shown), a main flow outlet 14 connected by a conduit 16 to a suitable main burner 18, and a pilot flow outlet 20 connected by a conduit 22 to a pilot burner 24 which is disposed in igniting proximity to the main burner 18. A flame responsive element, such as a thermocouple 26 is disposed in the flame of pilot burner 24 and is connected by a cable 28 to an automatic safety device 29, such as an electromagnetic holding valve (not shown) which is conventionally known in the art and which is disposed to control the inlet 12.

The top of casing 10 is formed with a truncated conical bore 30 that intersects the inlet port 12 and that defines a seat for manually rotatable plug valve 32 having a corresponding conical portion seated in the bore 30. The plug valve 32 is retained in the bore 30 by means of a spring retainer plate 34 secured to the top of casing 10 by suitable fastening means, such as cap screws 36, which spring plate resiliently engages an annular shoulder radially projecting from the plug valve 32. The central portion of the plug valve 32 is hollowed out to define a chamber 37, the inlet of which is formed by a transverse circular opening 38 in the conical wall of the plug valve 32 so as to register with the inlet passage 12. Opposite the plug valve inlet 38, the conical wall thereof has a small transverse bore which is a pilot flow port 39 establishing communication between the chamber 37 and a pilot flow passage 40 leading to the pilot outlet conduit 41. A bypass pilot flow port 42 arcuately extends about the periphery of the plug valve 32 to establish communication between the inlet 12 and a bypass pilot flow passage 43 leading to the pilot outlet conduit 41 when the plug valve 32 is rotated to its "pilot" position as will be explained more fully hereinafter. The opened bottom wall of the plug valve 32 has an annular valve seat 44 which forms the outlet for the chamber 37 and which leads to an outlet chamber 45. A passageway 46 in the casing 10 leads from the outlet chamber 45 to a thermostatically operated main valve 48 which controls the fluid flow to the main outlet 14.

The thermostatically operated valve 48 may take any suitable form such as is illustrated in FIG. 2 that includes a coil spring 49 biasing the valve member 48 toward an annular valve seat 50; a valve stem 51 protrudes centrally from the valve member 48 through the valve seat 50 and slidably extends through a bored boss 52 to a counterbore formed on the rear wall of casing 10. The counterbore houses a snap acting mechanism comprising a round snap disc 53 mounted on the annular knife edged fulcrum of a relatively thick disc 54 that is movable in such counterbore. The snap acting mechanism is actuated by a thrust button 55 disposed on the end of a lever 56 that is carried by a mounting shank 57. The mounting shank 57 is secured to the rear wall of the casing 10 as by threaded cap screws (not shown) and includes a threaded boss 58 for attaching the device to a heating appliance, such as the tank of a hot water heater. The temperature responsive unit, such as a conventional inner rod 59 of Invar or the like and an outer concentric tube 60 of copper or the like, is carried by the boss 58 so that the inner end of rod 59 engages an intermediate portion of the lever 56. The lever 56 protrudes out of a guide slot in the mounting shank 57 and has a perpendicularly bent end 61 which lies over the top of casing 10. The lever end 61 is normally biased into engagement with a rotatable cam 62 fastened to a temperature setting dial 63.

The thermoelectric safety device and the thermostatically operated valve means are conventional structures in the art and a complete description thereof are found in U. S. Pat. No. 2,953,937.

As is shown in FIG. 1, the main flow from the chamber 37 is regulated by a regulating valve 64 which has a flared periphery disposed in the chamber 45 so as to be downstream of the valve seat 44 for cooperation therewith. The regulating valve member 64 is integrally formed on the end of a valve stem 66 having a plurality of spaced guide tabs 68 disposed in a neckeddown portion of the plug valve chamber 37. The upper wall of plug valve chamber 37 is defined by a flexible diaphragm 70; the outer periphery of which is secured to the plug valve wall by means of an annular retaining clamp 72, and the inner periphery of which is secured to an intermediate portion of the valve stem 66 by means of a second annular retaining clamp 74. A longitudinal bore 76 in the valve stem has a lower port 78 opening into the outlet chamber 45 and an upper transverse port 80 opening into a pressure chamber 82. The upper port 80 is located between the mount for the flexible diaphragm and a second mount for a second flexible diaphragm 84. The diaphragm 84 has an enlarged center 86 with an internally beaded bore that snap fits on the grooved end of valve stem 66 and with an external annular groove providing attaching means for a diaphragm back-up plate 88. A regulator coil 90 is mounted in compression between the back-up plate 88 and an adjustable set screw 92 that is centrally threaded into the flat wall of a generally cup-shaped cover 94 which is rolled on or crimped over an annular flange of the plug valve 32. A similarly shaped plug valve dial 96 encloses the cover 94 and is snap fitted thereto by means of annular flanges which clamp the outer periphery of the upper diaphragm 84 to an annular flange on the plug valve 32. An aperture 98 in the regulator cover 94 provides an atmospheric vent for the regulator assembly whereby the chamber between the upper surface of the diaphragm 84 and the cover 94 is vented to the atmosphere; a similar aperture is provided in dial 96 or the dial 96 may be merely a nonsealed assembly with the cover 94. The dial 96 is provided with suitable position indicating markings (not shown) to indicate the "off," "pilot" and "on" positions of the plug valve 32.

When the plug valve dial 96 is in its "off" position, the tapered wall of the plug valve 32 closes off the inlet 12 so there is no fule flow to the plug valve's main port 38 and bypass pilot port 42. To initiate operation of the control system, the plug valve dial 96 is rotated from its "off" position to its "pilot" position whereby the main port 38 is still out of registry with the inlet 12 but the bypass pilot port 42 permits a fuel flow from the inlet 12 through the bypass port 42, the bypass pilot passage 43, the pilot outlet conduit 41, the pilot outlet 20 and the pilot conduit 22 to the pilot burner 24; with the thermoelectric safety device 29 being held in its reset position as is well known in the art, the fuel from pilot burner 24 is ignited, as by a match. As soon as the pilot burner flame sufficiently heats the thermocouple 26, the safety device 29 may be released and the safety valve therein will be retained in its open position. While in its "pilot" position, there is no back flow of pilot fuel from pilot passage 40 because the plug valve's pilot port 39 is not in registry therewith.

The plug valve dial 96 is now rotated from its "pilot" position to its "on" position bringing the plug valve's main port 38 and pilot port 39 in registry with the main inlet 12 and the pilot passage 40, respectively. During such rotation there is no interruption of fuel flow to the pilot burner because the arcuate lengths of the plug valve ports 39 and 42 overlap to assure communication between pilot port 39 and pilot passage 40 before closing off communication between bypass pilot port 42 and bypass pilot passage 43. In its "on" position, the plug valve 32 establishes a main flow of fuel from the inlet 12 through the plug valve port 38, the plug valve chamber 37, the valve seat 44, the outlet chamber 45 to the main passageway 46 where it is subject to the thermostatic control of the valve 48 before proceeding through the main outlet 14 and main conduit 16 to the main burner 18 where it is ignited by the flame of the pilot burner 24.

In accordance with the present invention, the pressure of the main fuel flow past the valve seat 44 is regulated by the valve member 64. The main fuel flow in the outlet chamber 45 also proceeds through the valve stem opening 78, the valve stem bore 76 and the valve stem port 80 into the pressure cavity 82. Thus, the underside of diaphragm 84 is subject to a pressure force which varies in accordance with outlet pressure variations while the topside thereof is subject to a predetermined load force which is adjustable for pressure regulation above atmospheric pressure by the regulator spring 90 and screw 92. The regulator diaphragm 84, which is centrally fixed to the top of valve stem 66, effects movement of the regulating valve 64 relative to the regulating valve seat 44 by sensing the outlet pressure of the fuel in the chamber 45; such regulatory movement compensates for pressure variations in the outlet chamber i.e., variations from a desired pressure as set by the regulator spring 90 and screw 92.

The upper diaphragm 84 defines the regulating diaphragm for the regulator assembly while the lower diaphragm 70, which has a smaller surface area than the regulating diaphragm 84, defines a balancing diaphragm that separates the inlet pressure chamber 37 from the outlet pressure chamber 82. Thus, the inlet pressure on the regulating valve 64 is balanced by the balancing diaphragm 70.

Assuming now that the medium being heated by the main burner 18 is below the desired temperatures as set by the knob 63, the thermostatic unit 59–60 will have opened the main control valve 48 whereby the pressure regulated flow is traced from the outlet chamber 45, through main flow passage 46, valve seat 50, main outlet 14 and main conduit 16 to the main burner 18 where it is ignited by the flame from the pilot burner 24. The main burner 18 is subsequently cycled thermostatically in accordance with the heat requirements as sensed by the thermostatic unit until the plug valve 32 is manually rotated to its "off" position wherein all fuel flow is cut off or to its "pilot" position wherein main fuel flow is cut off but pilot fuel flow is maintained. In the event the flame at the pilot burner 24 is extinguished, the thermocouple 26 will cool and the thermoelectric safety device 29 will cut off all fuel flow; to restart the control system the resetting procedure outlined above must be performed and safe lighting is conventionally accomplished by means of an interlock between the plug valve dial 96 and the reset means whereby the reset means can be operated only when the plug valve dial 96 in is its "pilot" position.

The above construction has the particular advantage in that a balanced pressure regulator assembly and a rotary plug valve are simply and economically combined into a unitary device. The entire device may thus be assembled and calibrated at the factory; subsequent tampering with the present regulator screw 92 by unskilled personel is avoided because the dial 96 provides concealment means for the regulator adjustment means.

Figure 3:
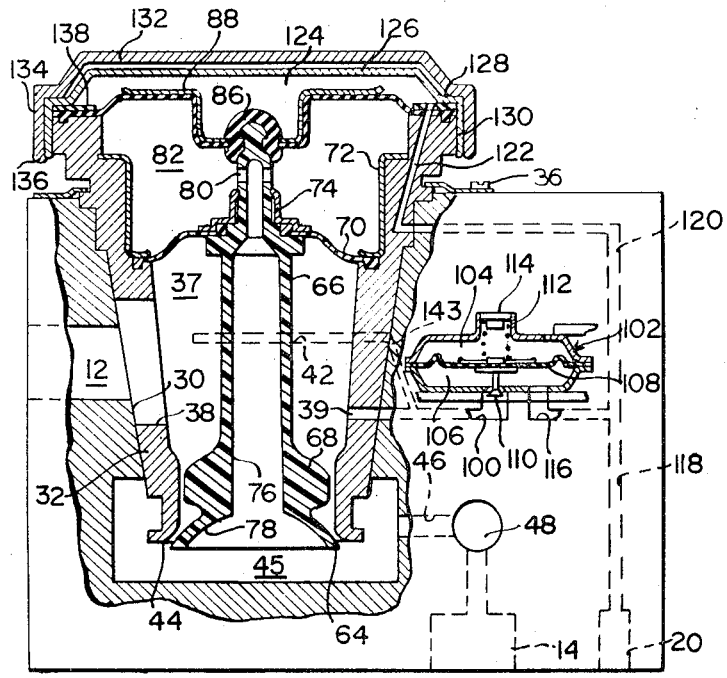
FIG. 3 is a view similar to FIG. 1 illustrating a modification thereof.

The embodiment illustrated in FIG. 3 provides a pressure loading for the regulating diaphragm 84 while the other structural components are the same as described in FIGS. 1 and 2 which will not be repeated. Accordingly, in FIG. 3, the identical reference numerals are utilized for those elements already described, and new reference numerals are utilized for new elements being described. For example, one end of pilot flow passage 100 communicates with the plug valve pilot port 39 and with the bypass pilot flow passage 143, while its other end leads to a pilot flow pressure regulator 102 having an atmospheric vented chamber 104 and an outlet pressure chamber 106 separated by a flexible diaphragm 108 made of rubber or the like. A pressure regulating valve 110 extends from the bottom surface of the diaphragm 108, the upper surface of which is biased by a coil spring 112 mounted in compression between a back-up plate on the diaphragm 108 and an adjustable plug 114 threaded into a suitable opening in the housing of the regulator 102. Downstream of the regulating valve 110, the outlet pressure chamber 106 communicates with a regulated pilot flow passage 116 having one branch 118 leading to pilot outlet 20 and another branch 120 leading to a regulated pilot flow port 122 in the exterior portion of the plug valve 32.

As is illustrated in FIG. 3, the regulated pilot flow port 122 communicates with a regulated pilot flow pressure chamber 124 defined by the top surface of the regulator diagphragm 84 and the regulator cover 126. The cover 126 has an inverted cup-shaped configuration with an annular abutment 128 adjacent an annular end flange 130. An indicia marked dial 132 (having "on," "off" and "pilot" positions as dial 96) has a shape similar to cover 126 with a mating annular abutment 134 adjacent an annular end flange 136. In this arrangement, the outer periphery of the diaphragm 84 is secured to the plug valve body by means of a covering ring 138 and aligned apertures therethrough register with the regulated pilot flow port 122. The ring 138 and gasket 140 are secured to the top of the plug valve 32 by the clamping action of the cover flange 130 which is rolled on or crimped over an annular shoulder on the plug valve 32 with the dial flange 136 being snapped onto the cover flange 130.

The modification of FIG. 3 provides pressure loading of the main regulator diaphragm 84 by means of the regulated pilot flow instead of the spring loading as shown in FIG. 1. By being in communication with plug valve port 39 and the plug valve chamber 37, the pilot flow passageways from the inlet side of the main pressure regulating valve 64 provide a pilot flow to the pilot flow regulator 102. Downstream of the pilot flow regulator 102, a pressure regulated pilot flow is channeled to an otherwise completely confined cavity 124 above the main regulator diaphragm 84 as well as to the pilot burner 24. This pilot flow regulator 102 thus not only directly regulates the pressure of the pilot flow to the pilot burner 24 but also provides the controlled pressure force for loading the main regulator diaphragm 84 which is utilized to obtain main flow pressure regulation. With the above arrangement, a regulated pilot flow to the pilot burner is provided when the plug valve dial 132 is in its "pilot" position as well as in its "on" position; while the porting 39 is not in registry with the pilot flow passage 100 in the "pilot" position, such registry occurs before porting through the bypass pilot flow passage 143 is terminated. In other respects, the structure and operation of the device in FIG. 3 is similar to that of FIGS. 1 and 2 so the description thereof is not being repeated for the sake of brevity.

Figure 4:
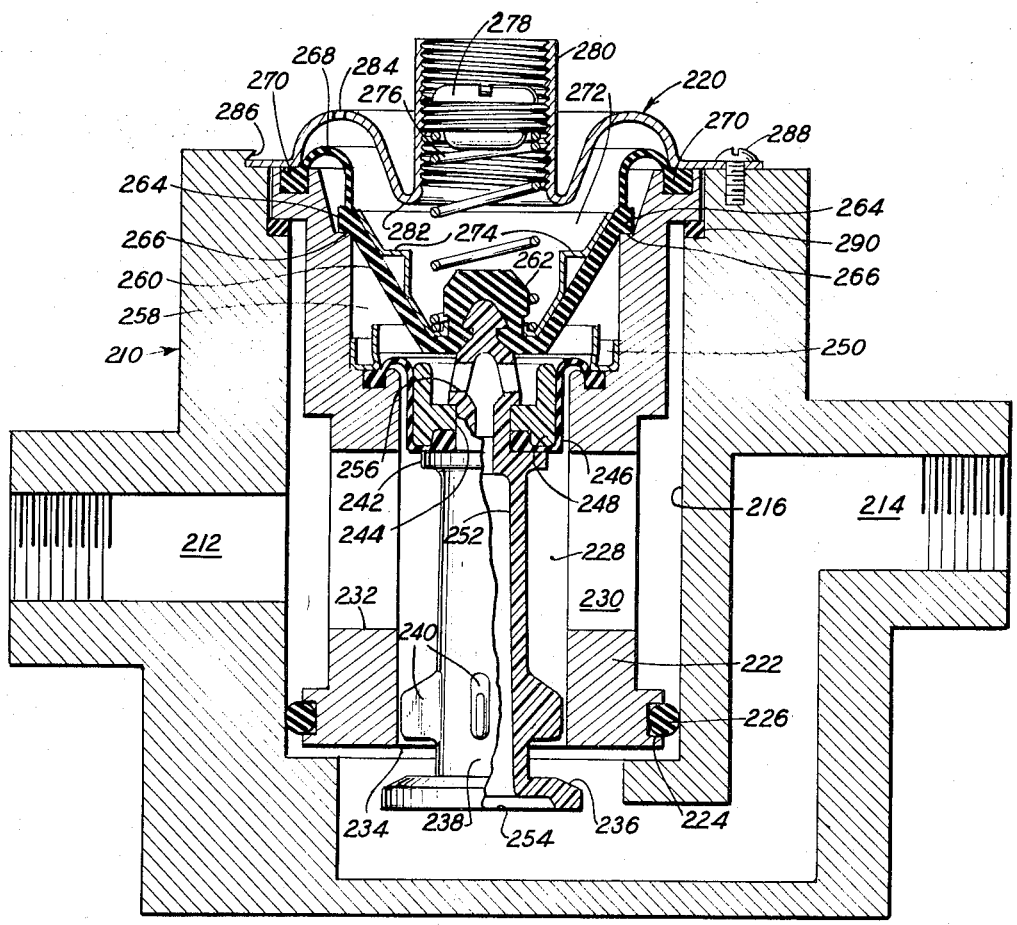
FIG. 4 is a schematic diagram in cross section of a control device having some components of FIG. 1 in capsule form.

In each of the devices shown in FIGS. 1 and 3, the plug valve and pressure regulator are preassembled as a unit in capsule form so that for final assembly the capsule need only be inserted in the appropriate bore. While the plug valve 32 is slightly biased into the conical bore 30 resulting in a gas-tight seal, the preassembled capsule may be provided with special sealing arrangements that eliminate the costly need for particular bores as is the case with the conical bore 30. Such an arrangement is illustrated in FIG. 4 wherein a casing, indicated generally at 210, has an inlet 212 and an outlet 214 with a bore 216 forming a chamber between the inlet 212 and outlet 214. While the inlet 212, outlet 214 and bore 216 are shown as openings in three different walls of the casing 210, such openings may be made in a variety of arrangments, e.g., the bore 216 could be a sidewall or the bottom wall, or the inlet 212 and outlet 214 could be on the same wall or on adjacent walls.

As is illustrated in FIG. 4, the pressure regulator capsule, indicated generally at 220, is adapted to be inserted in the bore 216 and includes a plug body 222, the inner end of which has an annular recess 224 on its periphery to receive a sealing member of any suitable type, such as an O-ring seal 226. The central portion of the plug body 222 is hollowed out to define a chamber 228, the inlet of which is formed by a pair of transverse, aligned ports 230 and 232 that are open to the bore 216 so as to be in continuous communication with the inlet 212. The opened bottom wall of the plug body 222 has an annular valve seat 234 which defines an outlet for the chamber 228 leading to the casing outlet 214.

The pressure of the fluid flow from the chamber 228 is regulated by a valve element 236 disposed for cooperation with the valve seat 234; while the valve element 236 is illustrated as being downstream of the valve seat 234, they may be reversed so that the valve element 236 is upstream of the valve seat 234 as would be desirable for particular installation requirements. The valve element 236 is integrally formed on the end of a valve stem 238 which has a plurality (four in the illustrated instance) of spaced guide fins 240 on its exterior surface to assure linear movement of the valve stem 238 in the plug body bore 228 and to streamline the fluid flow to the valve seat 234.

Adjacent its top portion (as viewed in FIG. 4), the valve stem 238 has an exterior annular shoulder 242 and an exterior necked down section defining an annular recess 244. The upper wall of the chamber 228 is defined by a flexible diaphragm 246, made of rubber or the like, having an inner periphery secured on the adjacent portions of recess 244 and shoulder 242 by means of a retainer ring 248 made of any suitable plastic material. The outer periphery of the diaphragm 246 has a circular cross section and is sealingly secured in an annular recess on the plug body 222 by means of an annular cup-shaped retainer 250 which is press fitted or otherwise securely fastened in the plug body 222. The plastic retainer 248 has an annular projection directed inwardly from its central portion to fill the stem recess 244 and slightly compress the inner periphery of the diaphragm 246 for sealing purposes. The outer wall of the retainer 248 is contiguous the adjacent portion of the diaphragm 246 to provide a rolling contact therebetween.

Figure 6:
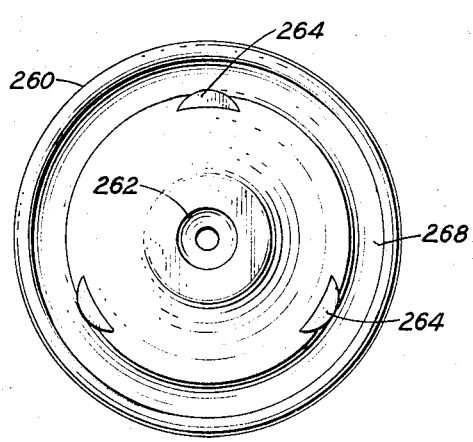
FIG. 6 is a top plan view of FIG. 5.
Figure 5:
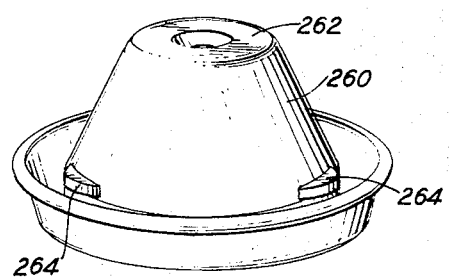
FIG. 5 is an inverted isometric view of the diaphragm of FIG. 4.

The valve stem 238 has a longitudinal bore 252 with a lower port 254 communicating wth outlet 214, and with an upper transverse port 256 opening into a pressure chamber 258. The transverse port 256 is located in the valve stem 238 between the connection for the diaphragm 246 and a second or end connection for a second flexible diaphragm 260, made of rubber or the like. The upper diaphragm 260 has an enlarged center 262 with an internally beaded bore that snap fits on the grooved end of the valve stem 238. As is illustrated in FIGS. 5 and 6, the diaphragm 260 has a conical configuration and is provided with a plurality of crescent-shaped projections 264 circumferentially spaced about its larger end portion. In FIG. 4, two such projections 264 are illustrated in order to present them in appropriate relation in cross sectional view; however, any suitable number may be utilized such as the three projections shown in FIGS. 5 and 6. The plurality of projections 264 cooperate with an annualr shoulder 266 internally formed in the plug body 222 to define a limit of movement for the valve stem 238 in a valve opening direction. Thus when the regulator assembly is not operating, the two diaphragms 246 and 260 are not subject to normal stretching.

The diaphragm 260 has an everted portion 268 extending from the area of the projections 264 to a terminal sealing and mounting bead 270. A generally conical diaphragm pan 272 has a centrally apertured annulus permitting the pan 272 to be snap fitted over the diaphragm center 262 for securely attaching the diaphragm 260 to the upper end of the valve stem 238. Intermediate its ends, the diaphragm pan 272 is provided with a plurality of transverse projections 274 which are circumferentially spaced from each other; only two projections 274 are illustrated in FIG. 4 but any suitable number may be utilized. The projections 274 are shown as being integrally formed on the pan 272 but they may be separately attached elements where desired.

A coil spring 276 is mounted in compression between the apertured annulus of the diaphragm pan 272 and an adjustment screw 278 threaded into a central cylinder of a cover 280. The cover 280 includes a rolled portion generally conforming to the shape of the diaphragm roll portion 268 and connected to the central cylinder by an annulus 282 which is disposed opposite the pan projections 274. The annulus 282 is engaged by the pan projections 274 to define a limit of movement of the valve stem 238 in a valve closing direction. The cover 280 is provided with at least one vent port 284 whereby the chamber on the top of the diaphragm 260 is subject to atmospheric pressure. The periphery of the cover 280 is attached to the top of the plug body 222 by any suitable means, such as cap screws (not shown), so that the cover 280 is an integral part of the assembly. As is shown in FIG. 4 the cover flange also retains the mounting bead 270 of the diaphragm 260 in its mounting recess on the top wall of the plug body 222. The top portion of the plug body includes an annular extension which engages a sealing means, such as an O-ring seal 290 to seal the casing bore 216 from the atmosphere. The entire regulator assembly 220 is thus easily attached or secured to the casing 210 as by staking 286 about the mounting flange of the cover 280; if desired threaded fasteners 288 may also be utilized to fasten the cover flange to the casing 210.

The arrangement in FIG. 4 has the particular advantage of permitting mounting into a variety of installations. For example, the simplicity of the device does not require the depth of the casing bore 216 to terminate in an annular shoulder but rather could be a straight bore inasmuch as the sealing ring 226 need only engage the side walls of the bore at a position downstream of the inlet 212. Since the valve seat 234 and the valve element 236 do not require any particular cooperation with the bore 216 or the walls of the flow passage leading to the outlet 214, the entire capsule 220 is self contained so that it may merely be inserted in a pipe or conduit for controlling fluid flow therethrough.

The balancing diaphragm 246 has one side subject to inlet pressure and defines a connection between the plug body 222 and the valve stem 238 whereby the plug body 222 is separated into upper and lower sections. The upper section includes the pressure chamber 258 and the components mounted thereon; the lower section of the plug body 222 includes the chamber 228 with its inlet and outlet means. As is shown in FIG. 4, the lower section of the plug body 222 is constructed with an upstream portion and a downstream portion and with the O-ring seal 226 separating the two portions; such arrangmeent assures that the fluid flow can only pass the valve seat 234 in accordance with the position of the valve element 236.

It should be noted that the illustrated positions of the various components of the regulator capsule 220 are shown without any fluid flow therethrough. Once there is fluid flow from the casing inlet 212, the operation of the regulator assembly would be substantially the same as that described above in connection with the operation of FIG. 1; accordingly, a detailed description of such operation is not being repeated for the sake of brevity.

Inasmuch as the present invention is subject to many modifications, variations, and changes in detail, it is intended that all matter contained in the foregoing description or shown on the accompanying drawings shall be interpreted as illustrative and not in a limiting sense.

What is claimed is:

1. In a gas flow control having a casing with an inlet, an outlet and an opened bore establishing communication between the inlet and outlet, the combination including a gas pressure regulating capsule mounted in said opened bore, said capsule comprising a plug body having oppositely disposed body sections, one of said body sections including upstream and downstream portions with a flow chamber therebetween, said upstream and downstream portions communicating with said inlet and outlet, respectively, mounting means including a cover on said other body section for securing the capsule to said casing, seal means between said mounting means and said casing to seal one end of the bore and prevent leakage therethrough, sealing means mounted on an end portion of said one body section and engaging said bore adjacent its other end and defining a fluid seal between said upstream and downstream portions whereby said capsule may accomodate a variety of casing installations, a valve seat in said one body section, a valve element operatively disposed downstream of said valve seat for cooperation therewith, balancing diaphragm means mounted between said body sections and defining a movable wall of said flow chamber, regulating diaphragm means mounted in the other body section and being spaced from said balancing diaphragm means to define a pressure chamber therebetween, a valve stem connecting said valve element to said regulating and balancing diaphragm means for imparting a balanced regulatory movement thereto, a passageway in said valve stem having one end opening into the downstream portion in said one body section and another end opening into the pressure chamber in said other body section whereby said regulating diaphragm means is responsive to outlet pressure in the downstream portion, said regulating diaphram means including a flexible diaphragm of generally conical configuration having a bottom portion connected to said valve stem and a peripheral portion sealingly mounted on said other body portion and retained thereon by said cover, a coil spring mounted between said cover and said bottom portion for normally biasing said flexible diaphragm, said valve stema and said valve element in a valve opening direction, a plurality of stop elements on said flexible diaphragm intermediate its bottom and peripheral portions and projecting into said pressure chamber, shoulder means on said other body section disposed in said pressure chamber and being engaged by said stop elements to define a limit of movement in a valve opening direction, stop means carried by said flexible diaphragm and projecting toward said cover, and an annulus on said cover oppositely disposed to said stop means and being engaged thereby to define a limit of movement in a valve closing direction.

2. The invention as recited in claim 1 wherein said one body section includes an annular recess on its periphery and wherein said sealing means includes an O-ring seal disposed in said annular recess.

3. The invention as recited in claim 2 wherein a diaphragm pan is secured to the bottom portion of said diaphragm and wherein said stop means includes projection means on said diaphragm pan.

4. The invention as recited in claim 3 wherein said cover includes an adjustable screw element engaging said coil spring whereby the biasing of said flexible diaphragm is adjustable.

5. The invention as recited in claim 4 wherein a plurality of guide fins are positioned on said valve stem in spaced relation to said valve element to guide said valve stem during movement and to streamline fluid flow to said valve seat.

6. The invention as recited in claim 5 wherein said plurality of stop elements are integrally formed on said flexible diaphragm in spaced relation to each other, and each stop element defines a crescent shaped projection.

* * * * *